May 14, 1946.  A. M. GOODLOE  2,400,347
OIL BATH AIR FILTER
Filed Nov. 2, 1944

INVENTOR.
Alfred M. Goodloe,
BY George D. Richards,
Attorney

Patented May 14, 1946

2,400,347

UNITED STATES PATENT OFFICE 2,400,347

OIL BATH AIR FILTER

Alfred M. Goodloe, Montclair, N. J., assignor to Metal Textile Corporation, West Orange, N. J., a corporation of Delaware Application November 2, 1944, Serial No. 561,545

6 Claims. (Cl. 183—15)

This invention relates to improvements in air filters or cleaners, and the invention has reference, more particularly, to an improved air filter or cleaner of the oil bath type, such e. g. as used for purging dust from air to be delivered to and through a carburetor or charge forming device serving an internal combustion engine.

This invention has for an object to provide a novel construction of oil bath air filter adapted to develop high initial velocity of air movement in contact with the oil content of the filter, whereby not only to efficiently carry oil to the filter medium for bathing and coating the latter therewith, but also to develop high initial air velocity within the receiving section of the filter medium so as to increase dust impingement efficiency and obtain fluid mixture of dust and oil without tendency of the mixture to thicken or cake; said filter medium being so formed and arranged as to permit air flow therethrough with diminishing velocity, whereby risk of oil escape or pull-over at the point of air discharge therefrom is avoided, and gravitation of oil and its accumulated dust content through the filter medium for discharge therefrom is facilitated.

Another object of this invention is to provide, in an air filter having an oil bathed filter medium, novel means to facilitate the withdrawal and discharge of dust laden oil from the medium.

Other objects of this invention, not at this time more particularly enumerated, will be understood from the following detailed description of the same.

Figure 1:
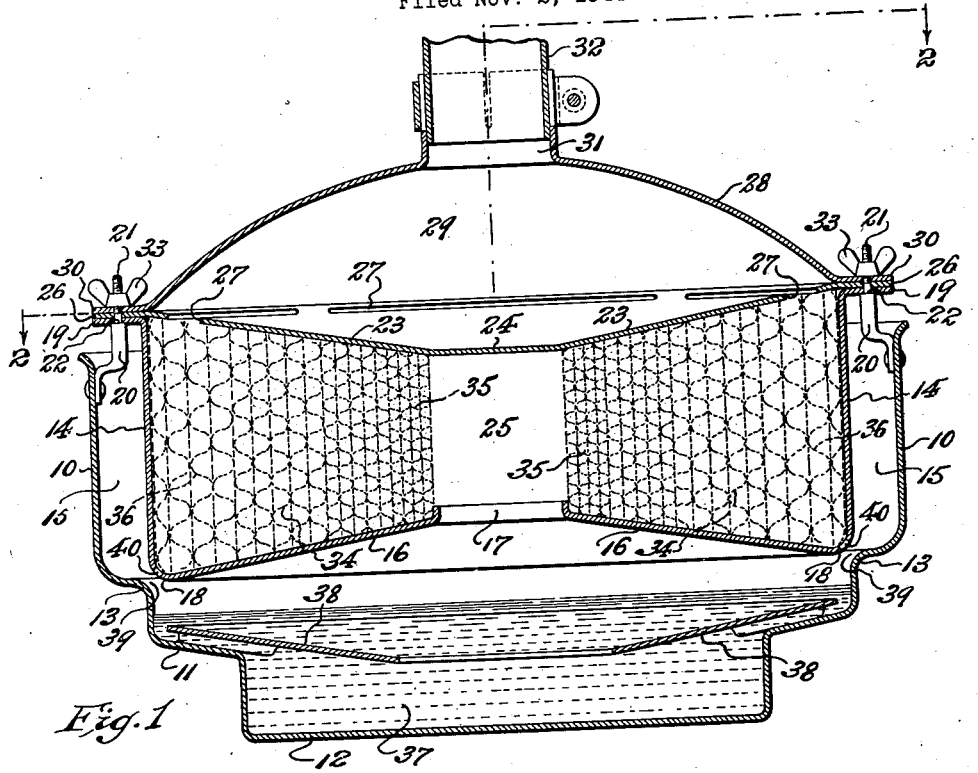
Figure 2:
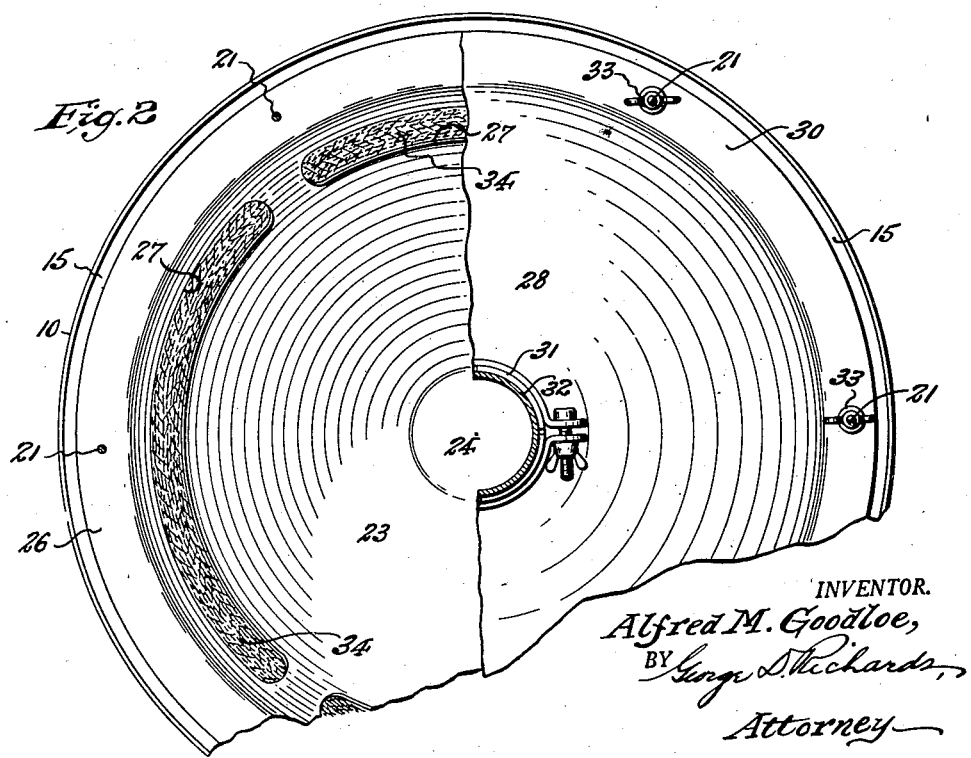

An illustrative embodiment of this invention is shown in the accompanying drawing, in which:

Fig. 1 is a vertical cross sectional view of an oil bath filter apparatus according to this invention; and Fig. 2 is in part a top elevational and part horizontal sectional view of the same, taken on line 2—2 in Fig. 1.

Similar characters of reference are employed in the above described views, to indicate corresponding parts.

Referring to the drawing, the novel air filter apparatus comprises an upwardly open housing or casing 10, having at its lower end a basin section 11 of reduced diameter from the central bottom portion of which depends a sump section 12 of further reduced diameter. The side wall of said housing or casing 10 is joined to the side wall of the basin section 11 by an inwardly bowed annular wall section 13 of convex cross-sectional shape.

Extending downwardly through the upwardly open top of the housing or casing 10 into the interior thereof is an upwardly open filter medium container 14 which is of a diameter smaller than that of said housing or casing, whereby an upwardly and outwardly open space is formed therebetween, said space providing a descending air intake passage 15 leading to the basin section 11 of the housing or casing 10. Said container 14 is provided with a bottom wall 16 which inclines downwardly and outwardly from a central opening 17, with which it is provided, to join the container side wall. Said bottom wall and container side wall are joined by an outwardly bowed annular wall section 18 of convex cross-sectional shape, which, when the container 14 is assembled within the housing or casing 10, and above the basin section 11 of the latter, is opposed in spaced relation to the annular wall section 13 of the housing or casing, for purposes hereinafter to be referred to. Connected with the margin of the upwardly open end of said filter medium container 14 is an outwardly projecting annular flange 19.

The filter medium container 14 is supported within and in operative relation to the housing or casing 10 by means of a plurality of circumferentially spaced bracket elements 20 which are affixed to the walls of said housing or casing in inwardly offset upstanding position, so as to project upwardly from and beyond the open top of said housing or casing. Each bracket element 20 is provided with an axially projecting screw-threaded stud 21 of reduced diameter to provide a supporting shoulder 22 therebetween.

The open top of the filter medium container 14 is closed by a cover plate 23 which inclines downwardly and inwardly from its outer marginal portion to merge with a central portion 24 which is aligned with and spaced above the central opening 17 of the container bottom wall 16, thus providing a laterally open axial air delivery passage 25 within the container 14 which is closed at its upper end by said central portion 24 of the cover plate 23. Connected with the margin of said cover plate 23 is an outwardly projecting annular flange 26, which overlies the flange 19 of said container 14. When the cover plate 23 is applied to the container 14, an annular filter medium enclosing chamber is formed which is bounded by top and bottom walls which converge upon said axial air delivery passage 25, whereby said chamber widens outwardly from said delivery passage, so as to progressively enlarge toward its outer boundaries. Said cover plate 23 is provided with clean air discharge ports or openings 27 which are disposed around and in communication with the enlarged outer portions of the container chamber.

The reference character 28 indicates the top cover or dome of the air filter apparatus, the same being disposed to overlie the filter medium container cover plate whereby to provide therebetween a clean air collection chamber 29. Connected with the margin of said top cover or dome 28 is an outwardly projecting annular flange 30 which overlies the cover plate flange 26. Said top cover or dome 28 is provided with an air outlet neck 31, to which may be suitably coupled a clean air conduit 32, through which the clean air discharge from the apparatus may be led to a desired place of use.

The flanges 19, 26 and 30 of the respective filter medium container 14, cover plate 23 and top cover or dome 28 are pierced with openings mutually registered to permit upward projection therethrough of the studs 21 of said bracket elements 20, whereby the assembled flanges are supported on the shoulders 22 of the latter; the assembly of the thus supported and related parts being secured in place by fastening nuts 33 which screw onto the projecting ends of said studs 21.

The chamber of the container 14 contains an annular mass of material adapted to serve as a filter medium which surrounds the axial delivery passage 25 so as to communicate therewith. Said filter material may consist of any one of many different kinds of material adapted in mass to provide an interstitial body 34, the surfaces of the constituent elements of which will hold a coating of oil or the like when wetted therewith. In making up the filter medium body, the material composing the same is arranged to be of varying density, gradually decreasing from its inner or air intake portion toward its outer or air discharge portion, whereby its inner or air intake portion 35 is of maximum density within the narrow or restricted air entrance side of the container chamber, being thence graded to decrease in density whereby its outer or air discharge portion 36 is of minimum density within the wide or enlarged air discharge side of the container chamber. A filter body thus characterized may be conveniently produced from knitted metallic mesh strip material wound or rolled upon itself into an annular mass, with its inner convolutions laterally compressed to form inner portions of the mass having interstices of minimum size and consequently portions of maximum density, the convolutions of the mass being permitted to gradually widen as they approach the outer limits of the mass, whereby to form, by the outermost convolutions, mass portions having interstices of maximum size and consequently portions of minimum density. The functional advantages of a filter body having such novel characteristics will be subsequently set forth.

The basin section 11 and sump section 12 of the housing or casing 10 is supplied with a body of oil 37 or other suitable filter medium wetting liquid. Removably supported within the basin section 11 is a centrally open disk-shaped metering plate 38 which divides or separates a surface portion of the oil 37 from the main mass of the latter contained in the basin and sump sections, whereby but a predetermined amount of the total quantity of oil is subjected to the transmissive action of the air entering the apparatus, so that only a desired amount of oil can be blown up into the filter medium 34.

The opposed convex wall sections 13 and 18, respectively of the housing or casing 10 and container 14, by their spaced opposition and shape provide a Venturi-like passage 39 between the air intake passage 15 and the upper interior of the basin section which underlies the filter medium container 14. Formed in the convex wall section 18 whereby to afford communication between the outer lower portion of the chamber of the filter medium container 14 and the restricted part of said Venturi-like passage 39 are openings 40 through which dust laden oil may be withdrawn from said filter medium container 14.

When the air filter apparatus of this invention is operatively connected with the carburetor or other charge forming device of an internal combustion engine, air will be drawn by the suction strokes of the engine pistons into the apparatus through the air intake passage 15, to be thence directed across the surface of the oil 37 contained in the basin section 11. The oil segregated by the metering plate 38 from the main body of oil constitutes but a relatively small part of the whole mass of oil, and since the metering plate 38 tends to prevent agitation of that part of the oil mass lying beneath the same, it is only the relatively small mass of oil above the metering plate which is subject to agitation by contact of the ingoing moving air stream therewith. As the air sweeps over the oil thus exposed to contact therewith, the agitation of the oil thereby is sufficient to spray and entrain oil globules in the air stream, whereby to carry onward therewith limited quantities of the oil for delivery with the air into and for movement through the filter medium 34. The oil laden air passes upwardly through the bottom opening 17 of the filter medium container 14 into the passage 25. Since the upper end of said passage 25 is closed by the central part 24 of the container cover plate 23, the oil laden air is compelled to enter the filter medium laterally from the sides of said passage 25, to first pass through the restricted inner side of the filter medium container chamber, and thus first into and through the portions 35 of the filter medium which are of maximum density. The oil thus carried with the air into and through the filter medium 34 will wet the surfaces of the filaments of the material thereof, so that such wetted surfaces, as impinged by dust particles suspended in the air, will catch and hold said dust particles, and thus separate the same from the air.

By reason of the restricted air entrance area at the inner side of the filter medium chamber and the increasing of the area thereof toward its outer air discharge side, the ingoing air enters the filter medium at maximum velocity, and consequently a maximum degree of agitation of the oil and dust content of the ingoing air occurs at the intake portions of the filter medium, which not only causes the oil carried by the air to thoroughly wet the filter medium material, but also increases the amount of dust caused to impinge upon the wetted surfaces, while at the same time permitting the resultant oil and dust mixture in the entrance zone of the filter medium to be subject to advancing movement through the filter medium while still maintained in a substantially fluid or flowable condition, thus preventing tendency of said mixture to become stationary and thereupon to unduly thicken or cake with choking effect upon the filter medium. Furthermore, due to the expanding capacity of the filter medium container chamber and the graded interstitial character and consequent decreasing density of the contained filter medium from its intake zone toward its discharge zone, the velocity of the air, as it progresses through the filter medium, tends to diminish, thus permitting the oil and dust mixture washed along therethrough by the air to become increasingly subject and responsive to the force of gravity, so that said mixture tends to descend through the filter medium and collect in the outlying bottom portion of the container chamber. Since the air is discharged upwardly and outwardly from the outlying portions of the filter medium at reduced velocity through the discharge ports or openings 27 of the container cover plate 23, the movement of the discharged air is in counterflow to gravitation of the oil and dust mixture and therefore efficient separation of the oil and dust from the air is further assured, and undesirable oil pull-over (i. e. discharge of oil particles with the outgoing air) is avoided.

The separated oil and dust mixture will discharge from the bottom interior of the filter medium container 14 through the escape openings 40. Since these escape openings 40 communicate with the restricted portion of the Venturi-like passage 39 through which the ingoing air must pass on its way to the filter medium of the apparatus, the increased velocity of the air stream moving through said Venturi-like passage tends to reduce pressure in the area of the air path adjacent to said escape openings 40, thus inducing a suction effect upon the oil and dust mixture within the lower bottom portion of the container 14 which substantially increases the rate of overflow of the mixture through the escape openings 40, and thus better purges the filter medium of collected dust so that the period of useful life of the filter medium is substantially prolonged, before necessity for removal, cleaning and replacement of the filter body is required. The oil and dust mixture thus withdrawn from the filter medium and its container is driven down by the ingoing air stream upon the body of oil contained in the lower portion of the apparatus, so as to be caught thereby, and by sinking down therethrough is caused to settle and collect in the sump section 12 of the housing or casing 10.

It will be understood that some changes may be made in the embodiment of this invention without departing from the scope thereof as defined in the following claims. It is therefore intended that all matter contained in the above description or shown in the accompanying drawing shall be interpreted as illustrative and not on a limiting sense.

I claim:

1. An air filter apparatus comprising an upwardly open casing having an oil holding section at its bottom, a filter medium container supported witin said casing adjacently above the oil holding section, said container having its side walls inwardly spaced from the casing side walls to provide an annular ingoing air passage communicating with the oil holding section, said container having central air intake means leading through its bottom wall and air discharge means in its top wall adjacent the side walls, bottom and top walls of said container being formed to provide an annular container chamber progressively and symmetrically enlarging in vertical cross sectional area from its central air intake means toward the container side walls and beneath said air discharge means, an annular interstitial mass of filtering material filling said annular container chamber around and in communication with said air intake means thereof, said container having oil and dust mixture discharge means disposed at the juncture of its bottom and side walls contiguous to the path of ingoing air above and directed toward the oil holding section, and means to collect and direct clean air emitted through the container air discharge means for delivery to a place of use.

2. An air filter apparatus comprising an upwardly open casing having an oil holding section at its bottom, a filter medium container supported within said casing adjacently above the oil holding section, said container having its side walls inwardly spaced from the casing side walls to provide an annular ingoing air passage communicating with the oil holding section, said container having central air intake means leading through its bottom wall and air discharge means in its top wall adjacent the side walls, bottom and top walls of said container being formed to provide an annular container chamber progressively and symmetrically enlarging in vertical cross sectional area from its central air intake means toward the container side walls and beneath said air discharge means, an annular interstitial mass of filtering material filling said annular container chamber around and in communication with said air intake means thereof, said filtering material being arranged and graded to progressively decrease gradually from a maximum density adjacent the container air intake means to a minimum density adjacent the container side walls and beneath the container air discharge means, said container having oil and dust mixture discharge means disposed at the juncture of its bottom and side walls contiguous to the path of ingoing air above and directed toward the oil holding section, and means to collect and direct clean air emitted through the container air discharge means for delivery to a place of use.

3. An air filter apparatus comprises an upwardly open casing having at its bottom an oil basin section of reduced diameter, a filter medium container supported within said casing adjacently above the oil basin section, said container having its side walls inwardly spaced from the casing side walls to provide an annular ingoing air passage communicating with said oil basin section, said container having central air intake means leading through its bottom wall and air discharge means in its top wall adjacent the side walls, bottom and top walls of said container being formed to provide an annular container chamber progressively and symmetrically enlarging in vertical cross-sectional area from its central air intake means toward the container side walls and beneath said air discharge means, an annular interstitial mass of filtering material filling said annular container chamber around and in communication with said air intake means thereof, an inwardly directed convex wall section at the juncture of the casing and oil basin section side walls, an outwardly directed convex wall section at the juncture of the container bottom and side walls and opposed to said first mentioned convex wall section, whereby to provide a Venturi-like passage between said ingoing air passage and the interior of said oil basin section spaced above the surface level of the oil within the latter, said container convex wall section having oil and dust mixture discharge means communicating with said Venturi-like passage, and means to collect and direct clean air emitted through the container air discharge means for delivery to a place of use.

4. An air filter apparatus as defined in claim 3, wherein the filtering material is arranged and graded to progressively decrease gradually from a maximum density adjacent the container air intake means to a minimum density adjacent the container side walls and beneath the container air discharge means.

5. An air filter apparatus comprising an upwardly open casing having at its bottom an oil basin section of reduced diameter provided with a dependent oil sump section of further reduced diameter, a centrally open metering plate supported across said basin section and above said oil sump section, a filter medium container supported within said casing adjacently above the oil basin section, said container having its side walls inwardly spaced from the casing side walls to provide an annular ingoing air passage communicating with said oil basin section, said container having central air intake means leading through its bottom wall and air discharge means in its top wall adjacent the side walls, bottom and top walls of said container being formed to provide an annular container chamber progressively and symmetrically enlarging in vertical cross-sectional area from its central air intake means toward the container side walls and beneath said air discharge means, an annular interstitial mass of filtering material filling said annular container chamber, an inwardly directed convex wall section at the juncture of the casing and oil basin section side walls, an outwardly directed convex wall section at the juncture of the container bottom and side walls and opposed to said first mentioned convex wall section, whereby to provide a Venturi-like passage between said ingoing air passage and the interior of said oil basin section spaced above the surface level of the oil within the latter, said container convex wall section having oil and dust mixture discharge means communicating with said Venturi-like passage, and means to collect and direct clean air emitted through the container air discharge means for delivery to a place of use.

6. An air filter apparatus as defined in claim 5, wherein the filtering material is arranged and graded to progressively decrease gradually from a maximum density adjacent the container air intake means to a minimum density adjacent the container side walls and beneath the container air discharge means.

ALFRED M. GOODLOE.